United States Patent [19]

Strehler et al.

[11] Patent Number: 4,616,730
[45] Date of Patent: Oct. 14, 1986

[54] CONTROL CHAIN CONNECTION

[75] Inventors: Richard Strehler, Chieming; Guenter Babisch, Munich, both of Fed. Rep. of Germany

[73] Assignee: Carl Hurth Maschinen und Zahnradfabrik GmbH & Co., Munich, Fed. Rep. of Germany

[21] Appl. No.: 732,484

[22] Filed: May 9, 1985

[30] Foreign Application Priority Data

May 30, 1984 [DE] Fed. Rep. of Germany ....... 3420146

[51] Int. Cl.$^4$ .............................................. B62D 1/20
[52] U.S. Cl. ..................................... 180/253; 180/23; 74/496; 74/89.21
[58] Field of Search ................. 180/253, 254, 255, 23, 180/234, 252; 74/496, 89.21, 89.2, 89.22

[56] References Cited

U.S. PATENT DOCUMENTS

| | | | |
|---|---|---|---|
| 3,108,488 | 10/1963 | Huszar | 74/465 |
| 3,364,781 | 1/1968 | Ulinski | 74/496 |
| 3,888,135 | 6/1975 | Goering | 74/496 |
| 4,461,367 | 7/1984 | Eichinger et al. | 180/252 |
| 4,513,839 | 4/1985 | Nieminski et al. | 18/253 |

FOREIGN PATENT DOCUMENTS

| | | |
|---|---|---|
| 690982 | 4/1940 | Fed. Rep. of Germany . |
| 1240415 | 9/1965 | Fed. Rep. of Germany . |
| 16220 | of 1899 | United Kingdom . |
| 973382 | 10/1964 | United Kingdom . |

*Primary Examiner*—John J. Love
*Assistant Examiner*—Donn McGiehan
*Attorney, Agent, or Firm*—Flynn, Thiel, Boutell & Tanis

[57] ABSTRACT

To fasten the control chain on a drive unit of a controllable drive wheel of an industrial vehicle, a housing part is provided on the top thereof with holes which are arranged in a circle. A chain holder is placed into one of the holes, which chain holder is engaged with both the endmost bolt of one end link and also a tensioning mechanism which in turn is engaged with a further endmost bolt of another end link. Various alternate constructions are provided for the design of the chain holder and the tensioning mechanism.

6 Claims, 6 Drawing Figures

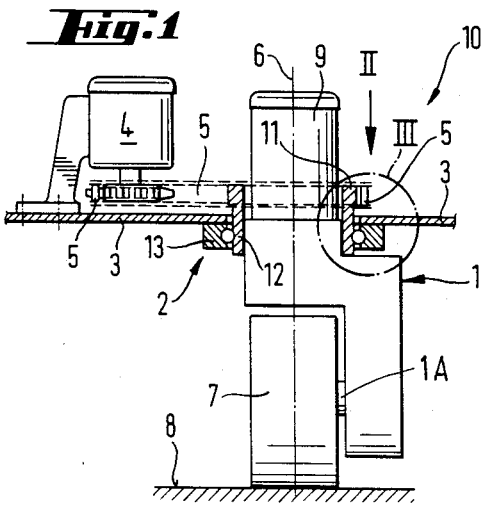
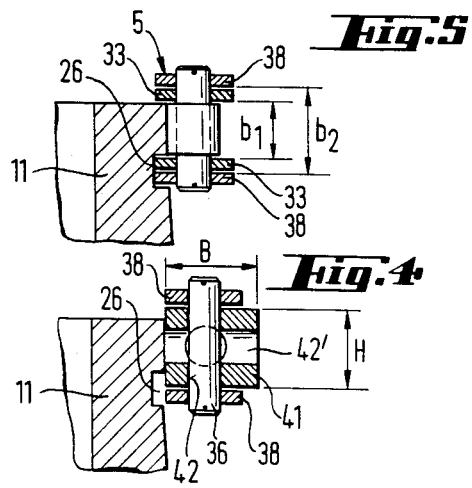
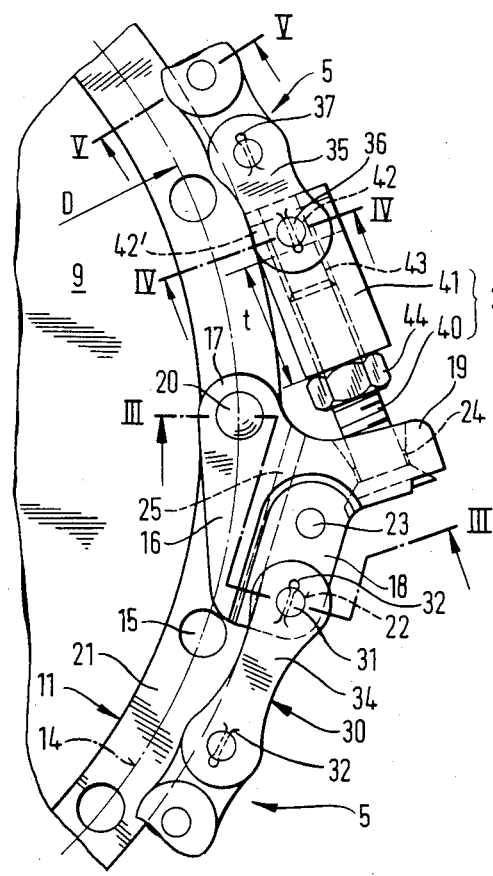
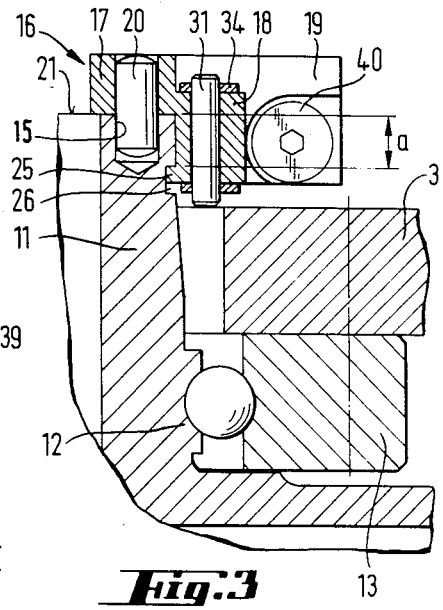
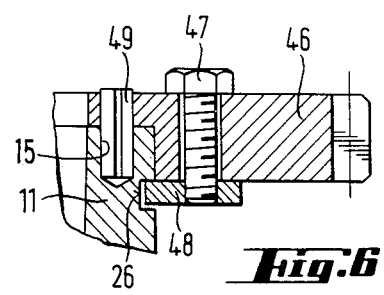

CONTROL CHAIN CONNECTION

FIELD OF THE INVENTION

The invention relates to a control chain connection on the drive unit of a controllable drive wheel of an industrial vehicle. The invention is an improvement over the state of the art, as it is for example known from U.S. Pat. No. 4,461,367.

BACKGROUND OF THE INVENTION

The control chain can be either a chain which is closed or endless and which engages a chain sprocket on a drive unit, or an open or finite length chain, the end links of which are fastened to the drive unit. In the latter case, it often happens that during the assembly to the vehicle, chain locks have been welded approximately on the side of a suitable housing part of the pivotal drive unit, which side lies opposite the chain sprocket, into which chain locks the control chain was placed. Or radially directed tapped holes were provided in the housing part, into which tapped holes screws were screwed and which were placed through the two bolts of a chain link. The area for mounting the chain locks or the threads results from the respective position of the chain sprocket relative to the drive unit and depends on the type of construction of the vehicle or the arrangement of the drive unit (left or right wheel or only single-wheel drive). The mounting of the fastening elements during the installation makes the installation sequence more difficult, in particular when, for example, the entire drive unit must be exchanged by the operator of the vehicle, and at a location whereat suitable shop equipment often does not exist. Also in particular welding on a finish mounted gearing arrangement requires particular skill and precautions in order to avoid damage to the bearings and/or the gears.

For tensioning or retensioning the control chain, the chain sprocket is supported on a readjustable rocker arm or the like. The structural expense for this is significant.

Therefore, the basic purpose of the present invention is to provide a control chain connection, which can be used independent of the position of the chain sprocket relative to the drive unit, without having to carry out any reworking on the drive unit, and which permits a simple tensioning or retensioning of the chain.

To attain the purpose, a control chain connection utilizes an arrangement of several holes in a cricle, into which a chain holder is mounted and which engages selectively directly or indirectly the chain ends, to facilitate an easy insertion of the drive unit without having to carry out subsequent operations and without having to take into consideration specific vehicle structural conditions. At the same time, the combination with a chain tensioning means makes possible a simplification for the arrangement of the chain sprocket or of the control motor.

The invention will be described hereinbelow with reference to two exemplary embodiments illustrated in six figures. More specifically:

FIG. 1 illustrates a drive unit and a control mechanism for a drive wheel of an industrial vehicle;

FIG. 2 is a top view of the control chain connection;

FIG. 3 is a cross-sectional view of the control chain connection taken approximately along the line III—III of 2;

FIG. 4 is a cross-sectional view of the holding piece of the chain-tensioning means taken along the line IV—IV;

FIG. 5 is a cross-sectional view of the control chain taken along the line V—V; and FIG. 6 illustrates finally yet another type of the control chain arrangement.

DETAILED DESCRIPTION

A gearing arrangement is identified generally by the reference numeral 1 in FIG. 1 and is supported for rotary movement about an upright axis 6 on a mounting ring 2 on a frame 3 of a vehicle which is not illustrated in detail. A wheel 7 is secured to the driven output shaft 1A of the gearing arrangement 1, which wheel 7 engages the ground 8. A drive motor 9 is secured to the gearing arrangement 1, the not shown shaft of which drive motor 9 is connected to the gearing of the gearing arrangement. Drive motor 9, gearing arrangement 1 and wheel 7 form a drive unit 10. The drive unit 10 can be pivoted about the vertical axis 6 by means of a control chain 5 which is driven by a motor 4 secured to the frame 3 to facilitate a steering control of the vehicle.

The gearing arrangement 1 has a mounted housing part 11 illustrated in greater detail in FIGS. 2 and 3. The housing part 11 has formed thereon an internal ring 12 (FIG. 3) forming a part of the mounting ring 2.

An external ring 13 is secured to the vehicle frame 3 and forms another part of the mounting ring 2. The housing part 11 has on its upper face 21 plural holes 15 distributed equidistantly from one another in a circle 14 arranged concentrically with respect to the axis 6. The illustrated example provides sixteen holes 15, which is to be considered as sufficient at the specified diameter D of the circle. In the case of larger diameter circles, more holes may possibly have to be provided. A pin 20 of a chain holder 16 extends into one of the holes. The chain holder 16 has, as shown in the top view of FIG. 2, approximately the form of a Y, the three arms of which are identified hereinafter as sections 17, 18 and 19. The section 17 of the chain holder 16, which also is pivotally mounted to the pin 20, engages or rests on the face 21 of the housing part 11. Compared with the section 17, the section 18 is offset lower and has two holes 22 and 23 therein extending parallel to the pin 20. The third section 19 extends even in height with the section 17 as shown in FIG. 3. The section 19 has a hole 24 therein which extends transversely therethrough as shown in FIG. 2. A barlike projection 25 is, in addition, provided on the section 18 and extends into a circumferentially extending groove 26 on the outside of the housing part 11. The distance a of the recess 26 below the face 21 corresponds approximately with the inside diameter $b_1$ of the inner links 33 of the control chain 5. The links 33 partially embrace the top and bottom edges, namely, at the distance a on the housing part 11 (FIG. 5). To mount the chain holder 16 on the support surface 21, it is rotated counterclockwise relative to the position which is illustrated in FIG. 2. If then the pin 20 is placed into the corresponding hole 15, the bar 25 passes on the outside of the housing part 11 and is then, by rotating the chain holder 16 into the illustrated position, guided into the recess 26, through which a locking of the chain holder 16 is created. A bolt 31 of an end link 30 of the control chain 5 is placed through the hole 22 in the section 18. The end link 30 is an external link, the one plate of which is secured with split pins 32. The thickness of the section 18 corresponds approximately with the width $b_2$ of the associated inner links 33.

The other end link 35 of the control chain 5 is also an external link, the one plate of which is secured with split pins 37. Its last bolt 36 is placed through a hole 42 in a holding piece 41 which hole extends, like the holes 22 and 23, parallel with respect to the pin 20. A tightening screw 40 is screwed into a tapped hole 43 which extends perpendicularly with respect to the hole 42. The tightening screw is placed through the hole 24 in the section 19 of the chain holder 16, the countersunk enlarged head of which rests on the section 19. To tension the control chain 5, the tightening screw 40 is screwed further into the tapped hole 43 in the holding piece 41. The tightening screw 40 and the holding piece 41 form in this manner a chain-tensioning means 39. To secure against an unintended release of the tightening screw 40, a lock nut 44 is provided. If the available screw-in depth t at the chain-tensioning means 39 is no longer sufficient for retightening, the end link 30 can be hung instead of in the hole 22, in the hole 23. For this reason the end link 30 has longer plates 34 than the other chain links. If desired, it is possible to also provide, aside from the holes 22 and 23, one or more further holes in the section 18; however, as a rule one will shorten the chain by one link—if a substantial retightening of the link chain should be necessary.

The holding piece 41 is constructed as a rectangular block, the cross section of which has a width B and a height H (FIG. 4), both corresponding with the width $b_2$ of each of the inner links of two different chain sizes. In the present exemplary embodiment, the width B corresponds with the next larger chain. Thus—if a hole 42' which is suited for this was provided—the holding piece can, through a simple 90° rotation, be used for two different chain sizes.

Drive units 10, which have a housing part 11, with holes 15 therein as it has been described above, can also be used in those cases in which an endless control chain 5 is used. A chain sprocket 46 is mounted in these cases (FIG. 6) to the housing part 11 and is held thereto by screws 47 and square nuts 48, one edge of which extends into the recess 26. Adapter sleeves 49 extend into the holes 15 and are provided for preventing relative rotation between the housing part 11 and the sprocket 46.

The inventive control chain connection assures a simple mounting and servicing. An additional advantage is the universal possibility of use of the correspondingly designed drive units for all cases of use with an open or finite length control chain and also for those with a closed or endless control chain. The invention is thereby not limited to the exemplary embodiments. The holes 15, for example, do not necessarily have to be arranged at equal distances from one another; if it is advantageous with respect to the construction, irregular spacing between the holes is possible. The chain holder 16 can also be designed in a mirror image form.

The identification $b_2$ for the width of the inner links was chosen depending on German standard DIN 8187.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a control chain connection between a sprocket on a drive motor and a drive unit of an industrial vehicle having a steerable drive wheel, said steerable drive wheel having an inner ring to which is secured said drive wheel and a support means for supporting said inner ring for movement about a vertically upright axis, said control chain at least partially encircling said inner ring so as to define two mutually adjacent ends, the improvement comprising wherein said inner ring has a plurality of holes therein arranged on a circle which concentrically surrounds said pivot axis, wherein a chain holder is provided and includes a pin adapted to be received in a selected one of said holes, said chain holder having securement means thereon for releasably securing said two mutually adjacent ends of said control chain together, said securement means including a chain tensioning means thereon for facilitating a tensioning of said control chain.

2. The control chain connection according to claim 1, wherein said securement means includes means for receiving end links with holes therein on said mutually adjacent ends of said control chain, said holes in said end links extending parallel to said plural holes in said inner ring, said holes in said end links receiving therein a respective endmost chain bolt.

3. The control chain connection according to claim 1, wherein said chain tensioning means consists substantially of a holding piece which is secured to one of said end links of said control chain, said holding piece having an internally threaded hole extending therethrough and a tightening screw with a head which rests on said chain holder and a threaded shank which extends through said internally threaded hole, said internally threaded hole having an axis extending perpendicularly with respect to an axis of said holes in said end links, said shank being threadedly coupled to said internally threaded hole and adjustable to a selectable screw-in depth to vary the tension of said control chain.

4. The control chain connection according to claim 3, wherein said holding piece has the shape of a rectangular block, the cross section of which has a width and a height corresponding in each case with a spacing between the inner links of two different chain sizes.

5. The control chain connection according to claim 1, wherien said chain holder further includes, for receiving one of said chain bolts of one end link, at least two selectively usable holes therefor.

6. The control chain connection according to claim 1, wherein said chain holder has plural sections, one of which engages said pin on said inner ring, a second section of which has a projection extending into a recess provided below a support surface on said inner ring and is couples to an end link.

* * * * *